Feb. 5, 1963　　H. F. HEINTZMANN ETAL　　3,076,672
CLAMP SUITABLE FOR MINE GALLERY MEANS
Filed Sept. 14, 1959　　　　　　　　　　　　2 Sheets-Sheet 1

INVENTORS
Hans Friedrich Heintzmann
Rudolf Seitz
by: Michael S. Striker
Attorney

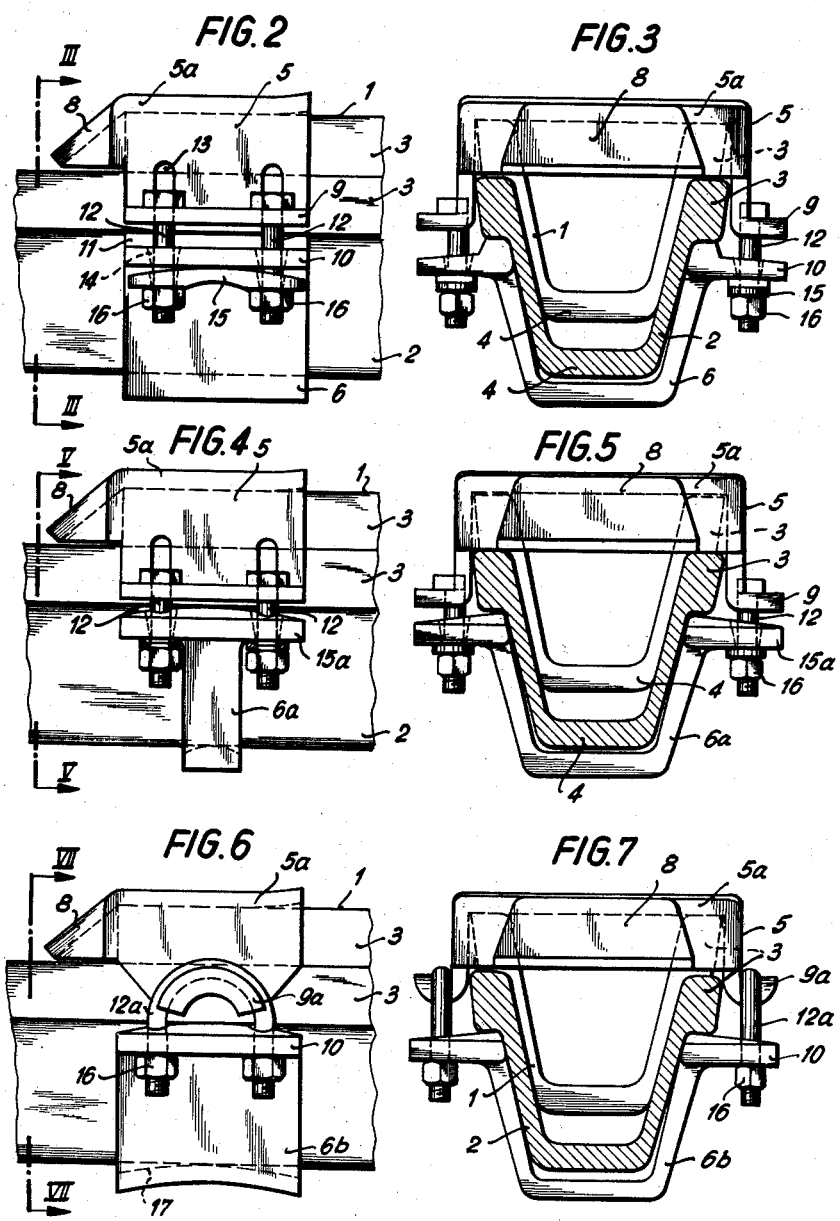

United States Patent Office 3,076,672
Patented Feb. 5, 1963

3,076,672
CLAMP SUITABLE FOR MINE GALLERY MEANS
Hans Friedrich Heintzmann and Rudolf Seiz, Bochum, Germany, assignors, by mesne assignments, to Bochumer Eisenhutte Heintzmann & Co., Bochum, Germany
Filed Sept. 14, 1959, Ser. No. 839,785
Claims priority, application Germany Sept. 13, 1958
21 Claims. (Cl. 287—103)

The present invention relates to clamps.

More particularly, the present invention relates to clamps which are adapted for use with support beams of mine galleries.

Beams of this latter type are connected togther so as to support the roof of the mine gallery. Thus, in the case of arched mine galleries there may be a pair of side beams and an arcuate roof beam having its lower ends overlapping the upper ends of the side beams. These beams are of substantially U-shaped cross section and the overlapping end portions nest within each other. These overlapping end portions are clamped together and the conventional clamps are designed so that where the forces acting on the beams become sufficiently great the clamps will permit slipping of the beams with respect to each other.

These clamps include on at least one side of the beams a plurality of fasteners distributed along each clamp, and for various reasons the nesting of the beams at their end portions one within the other is not uniform with the result that the fasteners are not uniformly stressed and in some cases the excessive stressing of one fastener leads to premature failure thereof.

The non-uniform nesting of the end portions of the beams within each other results from the relatively large tolerances of the beams and may also result from the slipping of the beams one with respect to the other. The non-uniform nesting of the beams one within the other at their end portions causes these end portions to extend angularly with respect to each other rather than parallel to each other, and as a result with conventional structures the fasteners on one side of the clamp members become unequally stressed and the fastener which is stressed to the greatest degree very often fails prematurely.

Although references made have been to overlapping beam end portions, the same problem arises with beam end portions which butt against each other at their end faces or which are even spaced slightly from each other. The clamps which clamp together such beam end portions are provided along at least one side of each beam end portion with a plurality of fasteners, and these fasteners also become non-uniformly stressed during a change in the position of the beams with respect to each other, with the result that a fastener which is stressed to a particularly great degree will fail prematurely.

One of the objects of the present invention is to overcome the above drawbacks by providing clamps of the type referred to above with a structure which will reliably distribute the forces acting on the fasteners substantially equally therebetween so that premature failure of any one fastener which is stressed to a degree greater than the other fasteners is reliably avoided.

It is also an object of the present invention to provide a clamp construction which will adapt itself to change in the relationship between the interconnected beam ends while maintaining substantially uniform stresses in the several fasteners.

An additional object of the present invention is to provide a clamp structure of the above type which is simple and at the same time very rugged.

With the above objects in view the invention includes, in a clamp which is adapted to be used with mine gallery beams, a pair of clamp members which are adapted to be connected together, and a pair of fasteners spaced longitudinally of these clamp members on at least one side thereof for fastening them together. In accordance with the invention an equalizing means cooperates with the fasteners to distribute the forces acting thereon substantially equally therebetween so as to prevent either one of the fasteners from becoming stressed to a degree substantially greater than the other fastener.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a fragmentary side elevation showing one embodiment of a clamp structure of the invention holding together a pair of nested beam end portions;

FIG. 3 is a transverse sectional view taken along line III—III of FIG. 2 in the direction of the arrows;

FIG. 4 is a side elevation of another embodiment of a clamp structure of the invention shown together with clamped beam end portions;

FIG. 5 is a transverse section taken along the line V—V of FIG. 4 in the direction of the arrows;

FIG. 6 is a side elevation of still another clamp structure according to the invention shown in FIG. 6 in cooperation with beam end portions; and FIG. 7 is a transverse section taken along the line VII—VII of FIG. 6 in the direction of the arrows.

Figure 1:
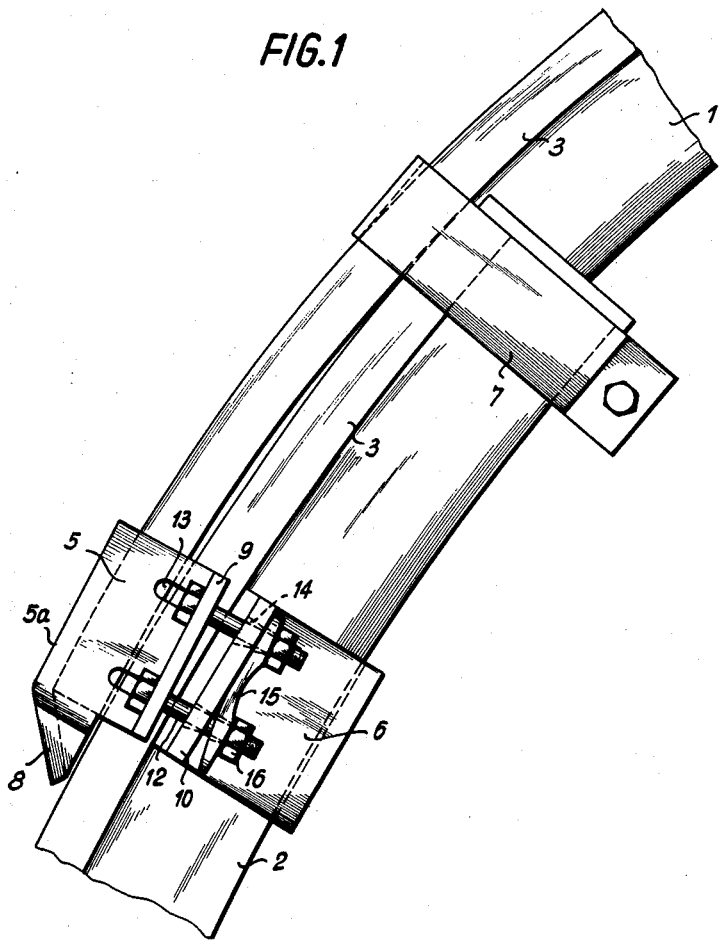
FIG. 1 is a fragmentary side elevation showing overlapping beam end portions held together by clamp structure according to the invention, the lack of uniformity in the nesting of the beam end portions being shown in FIG. 1 to an exaggerated degree in order to clearly illustrate the invention.

Referring now to the drawings, a pair of mine gallery beams 1 and 2 are illustrated therein with free end portions of these beams nested one within the other. As is apparent from FIG. 3, the beams have identical cross sectional configurations and they have relatively narrow flanges 3. The flanges 3 of the inner beam 1 directly engage the flanges 3 of the outer beam 2, and this outer beam 2 is somewhat lower than the inner beam 1 so that the bottom web 4 (FIG. 3) of the outer beam is spaced from the bottom web of the inner beam. FIG. 1 illustrates the extent to which the nested free ends of the beams overlap each other longitudinally, and, as is apparent from FIG. 1, the inner beam 1 forms the arched upper beam of a set of three beams forming an arch support for the gallery. One of the side beams 2 is shown in FIG. 1, and the end of the beam 1 which is not shown cooperates in an identical manner with the other side beam 2 at the other side of the arch.

The clamp of the invention which clamps together the overlapping end portions of the beams 1 and 2 includes a pair of clamp members 5 and 6. A guide ring 7 (FIG. 1) is fixed to the outer beam 2 and extends around the beam 1 to guide the beams at the region adjacent the extremity of the outer beam 2. The clamp member 5 has an end portion 8 located at the elevation of the end face of the beam 1 at the part of this end face which is located above the beam 2, so that in the event that beams 1 and 2 slip one with respect to the other, the clamp 5, 6 will be pushed by the beam 1 along the beam 2 and will be maintained by the beam 1 in the illustrated position with respect to beam 1. The ring 7 holds the beams together so that the beams do not move apart from each other in the region of the extremity of beam 2. Of course, the arrangement could be reversed so that the ring 7 is located adjacent the extremity of beam 1 and the clamp 5, 6 is located adjacent the extremity of beam 2. In this event the lower clamp member 6 would be provided with an end wall portion corresponding to the wall portion 8 and overlapping the end face of the beam 2.

FIG. 1 illustrates to an exaggerated degree the lack of uniformity in the nesting of the beams one within the other. This angular tilting of one beam with respect to the other could result from the shifting of the beams with respect to each other, and in a conventional clamp the fasteners such as bolts or the like located at one or both sides of the clamp members would be unequally stressed.

In the embodiment of the invention which is illustrated in FIGS. 1 and 3, the upper clamp member 5 is provided with a pair of lateral portions or side flanges 9 and the lower clamp member 6 is provided with a pair of side flanges 10, these members 5 and 6 being each of substantially U-shaped configurations and extending almost entirely around a space which receives the beams to be clamped. The clamp member 5 has an upper web 5a engaging the flanges 3 of the beam 1. The clamp member 6 is provided along the inner edge portions of the flanges 10 with special longitudinal ribs 11 which abut against the undersides of the flanges 3 of the beam 2. At each side of the clamp 5, 6, the flanges 9 and 10 thereof are formed with pairs of aligned openings through which a pair of fasteners in the form of bolts 12 extend. The heads of the bolts engage the flanges 9 and extend in part into cutouts 13 formed in the clamp member 5. The bolt heads are non-circular and by extending into the cutouts 13 the bolts 12 are prevented from turning around their axes, respectively. Also, the portions of the heads of the bolts which extend into the cutouts 13 guarantee that the bolts do not become lost. The openings 14 of the flange 10 are substantially larger than the cross sectional areas of the bolts 12. Also, the openings of the flange 9 can be larger than the bolt diameters.

In accordance with the present invention an engaging or equalizing means is provided so that the forces acting on the bolts 12 at each side of the clamp 5, 6 are substantially equally distributed between the bolts 12, and this equalizing means in the embodiment of FIG. 1 takes the form of an elongated rocker member 15 extending longitudinally of the clamp next to the flange 10 thereof. The member 15 has a length substantially equal to that of the flange 10 and has a raised central portion with a convex rocking surface extending longitudinally of the clamp and directed toward the flanges 9 and 10, this convex surface directly engaging the flange 10 in the embodiment of FIGS. 2 and 3. The equalizing means 15 is formed in its end portions at the opposite sides of the raised portion with openings through which the bolts 12 freely pass, these openings being larger than the cross sections of the bolts. Nuts 16 are threaded on to the bolts 12 and engage the face of member 15 which is directed away from the flange 10. If desired, washers having convexly curved end faces can be located between the nuts 16 and the member 15. If either one of the bolts 12 on each side of the clamp 5, 6 tends to be stressed to an unusually large degree, the member 15 will immediately transmit the stresses to the other bolt so that automatic equalizing of the stresses between the bolts takes place. This equalizing is provided not only when the beams are first connected together by the clamp of the invention, but also during the life of the assembly if at any time the conditions change so as to tend to stress one of the fasteners 12 to a degree greater than the other on each side of the clamp. For example, with the position of the clamp illustrated in FIG. 1 it may well have happened that where the clamp originally had the position shown in FIG. 2 the conditions change so as to tension the right fastener 12 of FIGS. 1 and 2 to an unusually great degree, and as is apparent from FIG. 1 the rocker member 15 has tilted from the position shown in FIG. 2 in a manner transmitting the tension to the left fastener of FIGS. 1 and 2 so that on the one hand the stresses are uniformly distributed between the fasteners and on the other hand the clamp members 5 and 6 orient themselves to the new position of the beams with respect to each other, as is clearly apparent from a comparison of FIGS. 1 and 2.

According to the embodiment of the invention which is illustrated in FIGS. 4 and 5 the lower clamp member 6a has a relatively short substantially U-shaped portion extending around the outer beam 2. With this embodiment the flanges at the free ends of the side walls of the clamp member 6a are considerably longer than and are symmetrically positioned with respect to these side walls 14. In this embodiment portions of the flanges of the clamp member 1a are suitably shaped so as to form the equalizing means 15a. Thus, the upper faces of the flanges of the clamp 6a are convexly curved longitudinally of the clamp and directly engage the flanges 3 of the outer beam 2 so that the equalizing means of FIGS. 4 and 5 forms part of the clamp member 6a. As is apparent from FIG. 5, the side walls of the clamp 6a are interconnected by a bottom end wall which is spaced from the bottom wall 4 of the outer beam 2 so that the clamp member 6a can tilt without obstruction from the beam 2, as required. As may be seen from FIG. 4 washers having spherical surfaces are located between the nuts 16 and the equalizing means. These washers are capable in a known way of adjusting themselves during shifting of the clamp members with respect to each other so that at all times the stressing of the fasteners 12 acts along the axes thereof, respectively, and is not eccentrically positioned with respect to these axes. The equalizing of the stresses between the fasteners 12 takes place with the embodiment of FIG. 4 in the manner described above in connection with the embodiment of FIG. 2. The only difference is that with the embodiment of FIG. 4 the entire clamp member 6a will tilt during equalizing of the stresses.

The embodiment of the invention which is illustrated in FIGS. 6 and 7 includes a lower clamp member 6b of the same length as the clamp member 6 of FIG. 2. However, the flanges 10 of the clamp member 6b are provided with longitudinally convex surfaces at their upper faces directly engaging the flanges 3 of the beam 2 so that the equalizing means is formed with the embodiment of FIG. 6 by portions of the flanges 10 of the clamp member 6b. The flanges 9a of the clamp member 5a of FIG. 6 are arcuate and may extend along circular arcs, and these flanges 9a are of substantially U-shaped cross section. The fasteners 12a of FIG. 6 are directly connected with each other by an arcuate intermediate portion which is received in each flange 9a so that the fasteners 12a respectively form the legs of a substantially U-shaped member whose arcuate intermediate portion engages the flange 9a. The fasteners 12a of FIG. 6 are connected with nuts 16 in the manner illustrated in FIG. 6. The intermediate portion which interconnects the fasteners of 12a of FIG. 6 has quite a large area of contact with the flange 9a so that only the relatively small pressure per unit of area can take place. Moreover, irrespective of the angular positions of the clamp members of FIG. 6 with respect to each other the uniform pressing of the intermediate portion against the flange 9a will be maintained. Of course, the equalizing means formed by the flanges 10 of FIG. 6 will obtain uniform stressing of the fasteners 12a. Furthermore, the upper wall of the clamp 5a and the lower wall 17 of the clamp member 6b are respectively provided with longitudinal convex surfaces directed toward each other and engaging the beams so that these clamp members can rock with respect to the beams to orient themselves as required in order to provide uniform stressing of all of the fastener elements.

In the case where a clamp of the invention is used to interconnect abutting beam ends or beam ends which are spaced slightly from each other, there will be at least a pair of fasteners alongside of each beam end at each side of the clamp, and it is the pair of fasteners associated with each beam at each side of the clamp that are acted upon by the equalizing means of the invention with such an arrangement.

It is apparent that the clamp of the invention automatically adapts itself to any changes in the position of the beams relative to each other and also the clamp of the invention prevents localized overloading.

In connection with the embodiment of FIG. 6, the arcuate flange 9a in cooperation with the intermediate portion interconnecting the fasteners 12a serves to minimize the load applied to the equalizing rocker flanges 10. Also, the flange 9a acts as an equalizing means which evenly distributes the forces between the fasteners 12a in the event of shifting of the beams with respect to each other, and in many cases the flange 9a at each side of the clamp member 5a of FIG. 6 will provide sufficient equalizing so that an additional equalizing means becomes unnecessary.

It will be understood that each of the elements described above, or two or more together, may also find a useful application in other types of clamps differing from the types described above.

While the invention has been illustrated and described as embodied in beam clamps, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A clamp adapted to be used with mine gallery beams, said clamp comprising, in combination, a pair of clamp members extending at least in part around a space in which the article to be clamped is adapted to be located; a pair of fasteners spaced from each other longitudinally along said clamp members on at least one side thereof, said fasteners connecting said clamp members to each other on said one side thereof and urging said clamp members toward each other on said one side thereof and at least one of said clamp members having at said one side thereof a longitudinal flange formed with openings through which said fasteners respectively extend; and equalizing means cooperating with said fasteners for distributing forces acting on said fasteners substantially equally therebetween, said equalizing means extending longitudinally of said clamp members on said one side thereof, also formed with a pair of openings through which said fasteners respectively extend, and said equalizing means having a convexly curved rocker surface extending longitudinally of said clamp members on said one side thereof and directed toward said flange.

2. A clamp adapted to be used with mine gallery beams, said clamp comprising, in combination, a pair of clamp members extending at least in part around a space in which the article to be clamped is adapted to be located; a pair of fasteners spaced from each other longitudinally along said clamp members on at least one side thereof, said fasteners connecting said clamp members to each other on said one side thereof and urging said clamp members toward each other on said one side thereof and at least one of said clamp members having at said one side thereof a longitudinal flange formed with openings through which said fasteners respectively extend; and equalizing means cooperating with said fasteners for distributing forces acting on said fasteners substantially therebetween, said equalizing means extending longitudinally of said clamp members on said one side thereof, also formed with a pair of openings through which said fasteners respectively extend, and said equalizing means having a convexly curved rocker surface extending longitudinally of said clamp members on said one side thereof and directed toward said flange, said equalizing means forming a flange of the other clamp member.

3. A clamp adapted to be used with mine gallery beams, said clamp comprising, in combination, a pair of clamp members extending at least in part around a space in which the article to be clamped is adapted to be located; a pair of fasteners spaced from each other longitudinally along said clamp members on at least one side thereof, said fasteners connecting said clamp members to each other on said one side thereof and urging said clamp members toward each other on said one side thereof and at least one of said clamp members having at said one side thereof a longitudinal flange formed with openings through which said fasteners respectively extend; and equalizing means cooperating with said fasteners for distributing forces acting on said fasteners substantially equally therebetween, said equalizing means extending longitudinally of said clamp members on said one side thereof, also formed with a pair of openings through which said fasteners respectively extend, and said equalizing means having a convexly curved rocker surface extending longitudinally of said clamp members on said one side thereof and directed toward said flange, the other clamp member having a flange coextensive with said flange of said one clamp member and also formed with openings through which said fasteners respectively extend, and said equalizing means being in the form of an elongated member having said rocker surface in engagement with that face of said flange of said other clamp member which is directed away from the flange of said one clamp member.

4. A clamp adapted to be used with mine gallery beams, said clamp comprising, in combination, a pair of clamp members extending at least in part around a space in which the article to be clamped is adapted to be located; a pair of fasteners spaced from each other longitudinally of said clamp members on at least one side thereof and connecting said clamp members to each other on said one side thereof and urging said clamp members toward each other on one side thereof, at least one of said clamp members having on said one side thereof a flange engaged by said fasteners; and equalizing means cooperating with said fasteners for distributing forces acting thereon substantially equally therebetween, said equalizing means extending longitudinally of said clamp members on said one side thereof, formed with a pair of openings through which said fasteners respectively extend, and having a convexly curved rocker surface extending longitudinally of said clamped members on said one side thereof and directed toward said flange.

5. A clamp adapted to be used with mine gallery beams, said clamp comprising, in combination, a pair of clamp members extending at least in part around a space in which the article to be clamped is adapted to be located; a pair of fasteners spaced from each other longitudinally of said clamp members on at least one side thereof and connecting said clamp members to each other on said one side thereof and urging said clamp members toward each other on one side thereof, at least one of said clamp members having on said one side thereof a flange engaged by said fasteners; and equalizing means cooperating with said fasteners for distributing forces acting thereon substantially equally therebetween, said equalizing means extending longitudinally of said clamp members on said one side thereof, formed with a pair of openings through which said fasteners respectively extend, and having a convexly curved rocker surface extending longitudinally of said clamped members on said one side thereof and directed toward said flange, said flange being arcuate and of substantially U-shaped cross section and said fasteners being integrally connected with an arcuate member located in said flange.

6. A clamp adapted to be used with mine gallery beams, said clamp comprising, in combination, a pair of clamp members extending at least in part around a space in which the article to be clamped is adapted to be located; a pair of fasteners spaced from each other longitudinally of said clamp members on at least one side thereof and connecting said clamp members to each other on said one side thereof and urging said clamp members toward each other on one side thereof, at least one of said clamp members having on said one side thereof a flange engaged by said fasteners; and equalizing means cooperating with said fasteners for distributing forces acting thereon substantially equally therebetween, said equalizing means extending longitudinally of said clamp members on said one side thereof, formed with a pair of openings through which said fasteners respectively extend, and having a convexly curved rocker surface extending longitudinally of said clamped members on said one side thereof and directed toward said flange, said flange being arcuate and of substantially U-shaped cross section and said fasteners being integrally connected with an arcuate member located in said flange, said equalizing means forming a flange of the other clamp member.

7. A clamp adapted to be used with mine gallery beams, said clamp comprising, in combination, a pair of clamp members adapted to be connected to each other, each clamp member having a pair of side walls and an end wall interconnecting said side walls so that each clamp member is of substantially U-shaped cross section, the end wall of at least one clamp member having a convex surface extending longitudinally of one clamp member and directed toward the other clamp member; a pair of fasteners spaced longitudinally of said clamp members on at least one side thereof for fastening said clamp members together on said one side thereof; and rockable equalizing means cooperating with said fasteners for distributing forces acting on said fasteners substantially equally therebetween.

8. A clamp adapted to be used with mine gallery beams, said clamp comprising, in combination, a pair of clamp members adapted to be connected to each other, each clamp member having a pair of side walls and an end wall interconnecting said side walls so that each clamp member is of substantially U-shaped cross section, the end wall of at least one clamp member having a convex surface extending longitudinally of one clamp member and directed toward the other clamp member; a pair of fasteners spaced longitudinally of said clamp members on at least one side thereof for fastening said clamp members together on said one side thereof; and rockable equalizing means cooperating with said fasteners for distributing forces acting on said fasteners substantially equally therebetween, said rockable equalizing means having a convex surface extending longitudinally of said clamp members and being of substantially the same curvature as said convex surface of said end wall of said one clamp member.

9. For use in a mine gallery, in combination, a pair of supporting beams respectively having overlapping end portions of substantially U-shaped cross section nested one in the other to provide inner and outer beam end portions, and at least the outer beam end portion having at least one side flange; a pair of clamp members extending around said overlapping beam end portions and one of said clamp members having a flange pressing against the flange of said outer beam end portion; a pair of fasteners spaced from each other longitudinally of said clamp members for connecting the latter together and urging the same toward each other, said pair of fasteners being located on the same side of said clamp members as said flanges; and equalizing means cooperating with said fasteners for distributing forces acting thereon substantially equally therebetween, said equalizing means including an elongated rock member engaging said flange of said one clamp member.

10. For use in a mine gallery, in combination, a pair of supporting beams respectively having overlapping end portions of substantially U-shaped cross section nested one in the other to provide inner and outer beam end portions, and at least the outer beam end portion having at least one side flange; a pair of clamp members extending around said overlapping beam end portions and one of said clamp members having a flange pressing against the flange of said outer beam end portion; a pair of fasteners spaced from each other longitudinally of said clamp members for connecting the latter together and urging the same toward each other, said pair of fasteners being located on the same side of said clamp members as said flanges; and equalizing means cooperating with said fasteners for distributing forces acting thereon substantially equally therebetween, said equalizing means forming part of said flange of said one clamp member and having an elongated convex surface extending longitudinally and directly engaging said flange of said outer beam end portion.

11. For use in a mine gallery, in combination, a pair of supporting beams respectively having overlapping end portions of substantially U-shaped cross section nested one in the other to provide inner and outer beam end portions, and at least the outer beam end portion having at least one side flange; a pair of clamp members extending around said overlapping beam end portions and one of said clamp members having a flange pressing against the flange of said outer beam end portion; a pair of fasteners spaced from each other longitudinally of said clamp members for connecting the latter together and urging the same toward each other, said pair of fasteners being located on the same side of said clamp members as said flanges; and equalizing means cooperating with said fasteners for distributing forces acting thereon substantially equally therebetween, said equalizing means forming part of said flange of said one clamp member and having an elongated convex surface extending longitudinally and directly engaging said flange of said outer beam end portion, said one clamp member having a pair of side walls and an end wall distant from said flange of said one clamp member and interconnecting said side walls thereof, and said end wall being spaced from said outer beam end portion.

12. For use in a mine gallery, in combination, a pair of supporting beams respectively having overlapping end portions of substantially U-shaped cross section nested one in the other to provide inner and outer beam end portions, and at least the outer beam end portion having at least one side flange; a pair of clamp members extending around said overlapping beam end portions and one of said clamp members having a flange pressing against the flange of said outer beam end portion; a pair of fasteners spaced from each other longitudinally of said clamp members for connecting the latter together and urging the same toward each other, said pair of fasteners being located on the same side of said clamp members as said flanges; and equalizing means cooperating with said fasteners for distributing forces acting thereon substantially equally therebetween, said equalizing means forming part of said flange of said one clamp member and having an elongated convex surface extending longitudinally and directly engaging said flange of said outer beam end portion, said clamp member having a pair of side walls and an end wall distant from said flange of said one clamp member and interconnecting said side walls thereof, said end wall having a convexly curved longitudinal surface directed toward said outer beam end portion.

13. For use in a mine gallery, in combination, a pair of supporting beams respectively having overlapping end portions of substantially U-shaped cross section nested one in the other to provide inner and outer beam end portions, and at least the outer beam end portion having at least one side flange; a pair of clamp members extending around said overlapping beam end portions and one of said clamp members having a flange pressing against the flange of said outer beam end portion; a pair of fasteners spaced from each other longitudinally of said clamp members for connecting the latter together and urging the same toward each other, said pair of fasteners being located on the same side of said clamp members as said flanges; and equalizing means cooperating with said fasteners for distributing forces acting thereon substantially equally therebetween, said equalizing means forming part of said flange of said one clamp member and having an elongated convex surface extending longitudinally and directly engaging said flange of said outer beam end portion, said one clamp member having a pair of side walls and an end wall distant from said flange of said one clamp member and interconnecting said side walls, and said side walls and end wall being substantially shorter than and located substantially midway between the ends of said flange of said one clamp member.

14. A clamp comprising, in combination, a pair of elongated rigid clamping means having elongated confronting surfaces, one of said confronting surfaces having a center surface portion closer to, and a pair of end surface portions more distant from the other confronting surface; and a pair of bolt means for connecting the ends of said clamping means to each other and located on opposite sides of said center surface portions so that superimposed elements clamped between said center surface portion and said other confronting surface may be angularly displaced relative to each other with one of said elements turning about said center surface portion while the clamping force remains uniformly distributed between said bolt means.

15. A clamp comprising, in combination, a pair of clamping means, each clamping means including a U-shaped clamping member having a pair of flanges, respectively, located opposite correlated flanges of the other clamping member, one of said clamping means including a pair of rigid pressure distributing parts, each pressure distributing part having an arcuate convex surface with a center surface portion closer to the respective flange of the clamping member of the other clamping means than the end surface portions of said convex surface; and two pairs of connecting means for coupling the ends of correlated flanges and pressure distributing parts so that superimposed elements clamped between said clamping means may be angularly displaced relative to each other.

16. A clamp comprising, in combination, a pair of clamping means, each clamping means including a U-shaped clamping member having a pair of flanges, respectively, located opposite correlated flanges of the other clamping member so that correlated opposite flanges have confronting surfaces and outer surfaces, one of said clamping means including a pair of rigid pressure distributing parts, each pressure distributing part having an arcuate convex surface with a center surface portion closer to the respective flange of the clamping member of the other clamping means than the end surface portions of said convex surface, said arcuate convex surfaces abutting said outer surfaces of the respective flanges of the clamping member of said one clamping means; and two pairs of bolt means for connecting the ends of correlated flanges and pressure distributing parts so that superimposed elements clamped between said clamping means may be angularly displaced relative to each other together with said flanges of said clamping members, with said flanges of said clamping member of said one clamping means turning on said arcuate convex surfaces.

17. A clamp comprising, in combination, a pair of U-shaped clamping members, each clamping member having a pair of rigid flanges respectively located opposite correlated flanges of the other clamping member so that correlated opposite flanges have confronting surfaces, said surfaces of said flanges of one of said clamping members being arcuate convex surfaces with center surface portions closer to the confronting surfaces of the correlated flanges of the other clamping member than the end surface portions of said convex surfaces; and two pairs of bolt means for connecting the ends of correlated flanges in the region of said end surface portions of said convex surfaces so that superimposed beams clamped between said confronting surfaces may be angularly displaced relative to each other with one of said beams turning about said arcuate convex surfaces while the clamping force remains uniformly distributed between said bolt means.

18. A clamp as set forth in claim 17 wherein said one U-shaped clamping member has a yoke portion extending across the respective adjacent clamped beam and having an inner arcuate convex surface for permitting turning of the respective adjacent beam.

19. A clamp as set forth in claim 17 wherein each of said flanges is formed with a pair of bores through which said bolt means extend, the bores of at least one of said flanges being at least partly wider than said bolts to permit angular displacement of said bolts therein.

20. A clamp as set forth in claim 17 wherein each flange of said other clamping member has an arcuate groove on said outer surface thereof; and a circular portion connecting the bolt means of each pair of bolt means and being located in said groove of the correlated flange of said other clamping member.

21. In a supporting arrangement, in combination, a first and a second elongated substantially U-shaped beam, said first beam nested within the second beam and each thereof comprising a pair of laterally extending flanges, each flange of one of said beams having a face facing away from the correlated flange of the other beam; an elongated clamping member extending transversely of and abutting against the faces of the flanges of one of said beams, said clamping member having lateral portions extending beyond the flanges of said one beam; rigid elongated engaging means associated with each flange of the other beam, each of said engaging means having a raised central portion abutting against the face of the respective flange of said other beam and a pair of end portions disposed at the opposite sides of said raised portion, said end portions normally spaced from the faces of the respective flanges of said other beam; and connecting means for coupling said end portions with the respective lateral portions of said clamping member so as to couple said other beam to said one beam and to permit angular displacements of said other beam about said raised portions and with respect to said one beam.

References Cited in the file of this patent

FOREIGN PATENTS 774,575    Great Britain _____ 1957